United States Patent
Sugimura et al.

(10) Patent No.: US 7,146,052 B2
(45) Date of Patent: Dec. 5, 2006

(54) IMAGE PROCESSING APPARATUS AND SURVEILLANCE CAMERA SYSTEM UTILIZING THE SAME

(75) Inventors: Yukio Sugimura, Osaka (JP); Akira Toguchi, Osaka (JP); Tetsuro Yabumoto, Kyoto (JP); Satoshi Tanaka, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 650 days.

(21) Appl. No.: 10/271,173

(22) Filed: Oct. 15, 2002

(65) Prior Publication Data

US 2003/0072492 A1    Apr. 17, 2003

(30) Foreign Application Priority Data

Oct. 15, 2001 (JP) ............................. 2001-316933
Oct. 25, 2001 (JP) ............................. 2001-327493

(51) Int. Cl.
*G06K 9/36* (2006.01)

(52) U.S. Cl. .................. 382/232; 382/236; 382/238; 382/239

(58) Field of Classification Search ............... 382/232, 382/234, 235, 247, 236, 239, 238; 759/217; 348/231.1, 220.1, 231.99; 386/117; 375/240.24, 375/240.25, 240.12, 240.1; 358/426.16
See application file for complete search history.

(56) References Cited

U.S. PATENT DOCUMENTS

| | | | |
|---|---|---|---|
| 5,032,927 A * | 7/1991 | Watanabe et al. ............ 386/101 |
| 5,291,282 A * | 3/1994 | Nakagawa et al. ..... 375/240.23 |
| 5,909,548 A * | 6/1999 | Klein et al. .................. 709/217 |
| 6,111,605 A * | 8/2000 | Suzuki ..................... 348/220.1 |
| 6,380,975 B1 * | 4/2002 | Suzuki ................... 348/231.99 |
| 6,690,417 B1 * | 2/2004 | Yoshida et al. ........... 348/231.1 |
| 6,697,568 B1 * | 2/2004 | Kaku ......................... 386/117 |

FOREIGN PATENT DOCUMENTS

JP    2001-054063    2/2003

* cited by examiner

*Primary Examiner*—Anh Hong Do
(74) *Attorney, Agent, or Firm*—Gerald T. Bodner (57) ABSTRACT

A surveillance camera system includes a multiplexer. The multiplexer successively selects image data output from each surveillance camera one by one so as to input the selected image data to an image recording apparatus. The image data input to the image recording apparatus is subjected to a compression process by a compression expansion circuit and then, recorded on a hard disk. The compression process is performed on the basis of a reference coefficient stored in a management list within a memory. It is noted that a value capable of the image data to be compressed up to a size within a target range is set as a reference coefficient in an initialization process by a CPU. Furthermore, the reference coefficient is sequentially renewed by the CPU at a recording process.

10 Claims, 6 Drawing Sheets

[COMPRESSED IMAGE FILE]

FIG. 3

[MANAGEMENT LIST]

| SURVEILLANCE CAMERA n | MODE 1 (56KB) | MODE 2 (42KB) | MODE 3 (30KB) | MODE 4 (22KB) | MODE 5 (15KB) |
|---|---|---|---|---|---|
| 1 | 80 | 71 | 53 | 36 | 25 |
| 2 | 72 | 61 | 48 | 29 | 21 |
| ⋮ | ⋮ | ⋮ | ⋮ | ⋮ | ⋮ |
| N | 75 | 68 | 50 | 33 | 22 |

IMAGE PROCESSING APPARATUS AND SURVEILLANCE CAMERA SYSTEM UTILIZING THE SAME

BACKGROUND OF THE INVENTION

1. Field of the Invention

The present invention relates to an image processing apparatus and a surveillance camera system. More specifically, the present invention relates to an image processing apparatus for processing a plurality of kinds of image signals output from a plurality of fixed cameras and multiplexed in a time-division manner, and a surveillance camera system utilizing the same.

2. Description of the Prior Art

In a surveillance camera system having a plurality of fixed surveillance cameras and capturing a plurality of image signals output from the plurality of fixed surveillance cameras in a time-division manner so as to record the captured image signals onto a recording medium, recently, a hard disk comes into wide use as a recording medium. In such the surveillance camera system, an image signal is recorded in a compressed state so as to store the image signal (image data) as large as possible on the hard disk. Furthermore, a compression ratio at a time of a compression process is adjusted such that a size (capacity) of a compressed image file obtained by the compression process falls within a certain range. Thus, the size of the compressed image file falls within a certain range, so that it is easy to deal with the compressed image file and to manage a capacity of the hard disk.

However, in such the surveillance camera system, respective surveillance cameras are placed at separate positions, and surveillance objects is apt to different depending on the respective surveillance cameras, and therefore, a following problem conventionally occurs. That is, as the surveillance objects are different depending on the surveillance cameras, the size of the image signals fetched from these surveillance cameras in a time-division manner is sequentially changed, and a compression ratio for compressing these image signals up to the above-described certain range of the size is also changed. However, there is a program that when the size of the image signal is sharply changed, the adjustment of the compression ratio cannot follow the change and therefore, it takes a long time to make the size of the compressed image file within the target range.

SUMMARY OF THE INVENTION

Therefore, it is a primary object of the present invention to provide an image processing apparatus or a surveillance camera system capable of quickly compressing each of a plurality of kinds of image signals output from a plurality of fixed cameras and multiplexed in a time-division manner up to a target range of size.

It is another object of the present invention to provide an image processing apparatus or a surveillance camera system capable of quickly compressing with a appropriate compression ratio each of a plurality of kinds of image signals output from a plurality of fixed cameras and multiplexed in a time-division manner.

According to the present invention, an image processing apparatus compressing on the basis of a reference compression ratio a plurality of kinds of image signals output from a plurality of fixed cameras and multiplexed in a time-division manner comprises: a capture for individually capturing the plurality of kinds of image signals at a time of receiving an initialization instruction; a specifier for specifying a compression ratio capable of compressing each of the plurality of kinds of image signals captured by the capture up to a size within a predetermined range; a storage for storing the compression ratio specified by the specifier as the reference compression ratio of each of the plurality of kinds of image signals.

The capture individually captures the plurality of kinds of image signals output from the plurality of fixed cameras at a time of receiving the initialization instruction. Then, the specifier specifies the compression ratio capable of compressing each of the plurality of kinds of image signals captured by the capture up to a size within a predetermined range. The compression ratio specified by the specifier is stored by the storage as the reference compression ratio respectively corresponding to the plurality of kinds of image signals. Accordingly, each of the plurality of kinds of image signals from the plurality of fixed cameras and multiplexed in a time-division manner is compressed on the reference compression ratio.

Thus, each of the plurality of kinds of image signals output from the plurality of fixed cameras is compressed on the basis of the reference compression ratio capable of compressing the size thereof up to the predetermined range, and therefore, it is possible to quickly compress each of the plurality of kinds of image signals up to a size of the target range.

In one embodiment of the present invention, the predetermined range includes a plurality of size ranges respectively corresponding to the plurality of quality modes. Then, the specifier specifies the plurality of compression ratios respectively corresponding to the plurality of image quality modes as to each of the plurality of image signals. Furthermore, the storage stores the plurality of compression ratios specified by the specifier by respectively being related to the plurality of image quality modes. Thus, even if the image quality mode is changed, it is possible to compress each of image signals on the basis of the reference compression ratio corresponding to the image quality mode.

In another embodiment of the present invention, the compressed image signal compressed on the basis of the reference compression ratio is recorded onto the recording medium by the recorder.

An image processing apparatus according to the present invention comprises: an inputter for inputting a plurality of kinds of image signals output from a plurality of fixed cameras and multiplexed in a time-division manner; a memory for storing a plurality of reference compression ratios respectively related to the plurality of kinds of image signals; a reader for reading from the memory a reference compression ratio related to a current image signal currently input by the inputter; a specifier for specifying an optimal compression ratio of the current image signal on the basis of the reference compression ratio read by the reader; a compressor for compressing the current image signal at the optimal compression ratio specified by the specifier; and a renewer for renewing the reference compression ratio related to the current image signal and stored in the memory by the optimal compression ratio specified by the specifier.

According to the present invention, the memory is stored with the plurality of reference compression ratios. Herein, when an image signal output from an arbitrary fixed camera is input by the inputter, the reader reads from the memory the reference compression ratio relating to the current image signal currently input by the inputter. Then, the specifier specifies the optimal compression ratio of the current image signal currently input on the basis of the reference compression ratio read by the reader, and the compressor compresses the current image signal at the optimal compression ratio specified by the specifier. Furthermore, the renewer renews the reference compression ratio related to the current image signal stored in the memory by the optimal compression ratio specified by the specifier. That is, the current image signal currently input from an arbitrary fixed camera is compressed at the optimal compression ratio specified on the basis of the previous optimal compression ratio.

Thus, the current image signal currently input from an arbitrary fixed camera is compressed at the optimal compression ratio specified on the basis of the previous optimal compression ratio, and therefore, it is possible to quickly compress at a appropriate compression ratio the image signal input in a time-division multiplexed manner from each fixed camera.

In another embodiment of the present invention, the specifier specifies the compression ratio capable of compressing the current image signal up to a size within a predetermined range as the optimal compression ratio. Thus, it is possible to compress the image signal input from each fixed camera up to the size of the predetermined range irrespective of the size of the image signal.

In the other embodiment of the present invention, the plurality of kinds of image signals are multiplexed in a time-division manner frame by frame. Then, the compressor performs compression in accordance with a JPEG format.

In further embodiment of the present invention, the compressed image signal compressed by the compressor is recorded onto the recording medium by the recorder.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
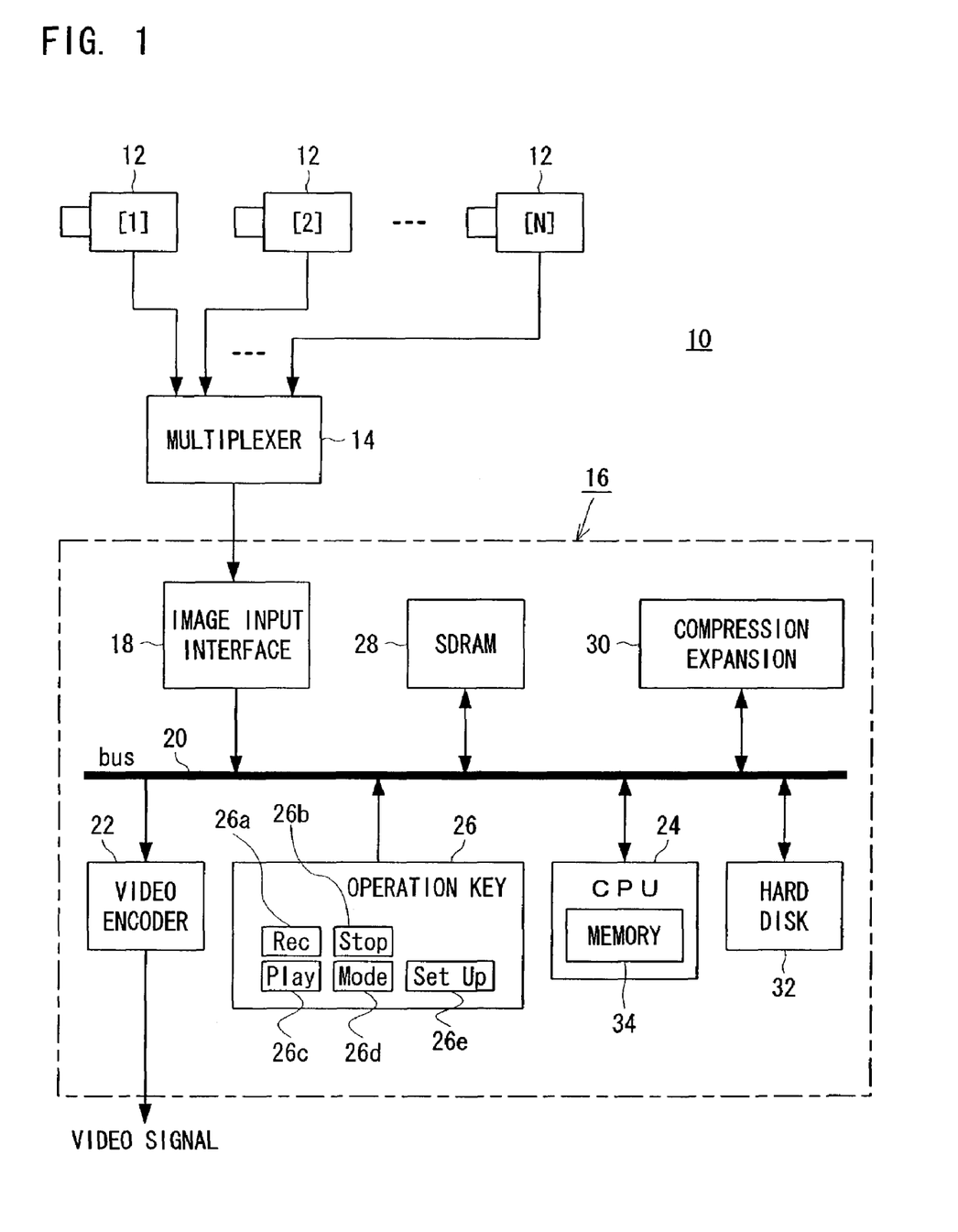
FIG. 1 is a block diagram showing one embodiment of the present invention.

Referring to FIG. 1, a surveillance camera system 10 of this embodiment includes a plurality number of (N) surveillance cameras 12, 12, . . . set at separate places, a multiplexer 14 at an input side thereof connected with these surveillance cameras 12, 12, . . . and an image recording apparatus 16 connected to the multiplexer 14 at an output side thereof.

Each of surveillance cameras 12, 12, . . . adopts digital system and digitizes an image signal of an object acquired by photographing at the inside thereof and then, outputs image data acquired from the digitization. It is noted that each of surveillance cameras 12, 12, . . . has an individual identifying number (n=1, 2, . . . , N) and superimposes ID information indicative of the identifying number n applied to oneself on VBI (Vertical Blanking Interval) information. A plurality of kinds of image data output from these surveillance cameras 12, 12, . . . are input to the multiplexer 14.

The multiplexer 14 sequentially selects (validates) one by one the plurality of kinds of image data input from the surveillance cameras 12, 12, . . . . The selected image data is input to the image recording apparatus 16. Thus, the plurality of kinds of image data output from respective surveillance cameras 12, 12, . . . are input to the image recording apparatus 16 in a time-division multiplexed manner. It is noted that what order each of respective surveillance cameras 12, 12, . . . (image data) is selected and at how long periods (time interval) a surveillance camera 12 to be selected is switched can be arbitrarily set by the multiplexer 14.

The image recording apparatus 16 has an image input interface circuit 18 to which the image data from the multiplexer 14 is input. The image input interface circuit 18 performs a YUV conversion process complying with a "YUV 4:2:2" format on the input image data. The image data converted by the YUV conversion process, i.e., YUV data is input to a video encoder circuit 22 via a data bus 20.

The video encoder circuit 22 converts the input image data to an analog video signal. There is, for example, a composite video signal or a component video signal (S video signal, RGB signal and etc.) as the analog video signal. The converted analog video signal is output to an outside the image recording apparatus 16 so as to be input to a monitor device not shown. Thus, live images photographed by respective surveillance cameras 12, 12, . . . are sequentially displayed on a screen of the monitor device in turn.

Furthermore, the image recording apparatus 16 has a CPU (Central Processing Unit) 24 built-in. The CPU 24, when a record starting (Rec) key 26*a* forming an operation key 26 is depressed, starts a recording operation.

At a time of the recording operation, the CPU 24 stores in an SDRAM (Synchronous Dynamic RAM) 28 image data subjected to the UYV conversion process by the image input interface circuit 18 one field by one field. The image data stored in the SDRAM 28 is read by the CPU 24 and then, transferred to a compression expansion circuit 30. The compression expansion circuit 30 performs a compression process complying with a motion JPEG (Motion Joint Photographic Expert Group) format on the transferred image data so as to generate a compressed image file. The generated compressed image file is temporarily stored in the SDRA M 28 by the CPU 24 and then, transferred to a hard disk 32 so as to be recorded.

It is noted that the live image is displayed on the screen of the monitor device according to the above-described process also in the recording operation. Furthermore, the CPU 24, when recording the compressed image file on the hard disk 32, adds attribute information of a tag to the compressed image file. The tag includes the above-described ID information (identifying number n), information indicative of the recording time on the hard disk 32. The information relating to the recording time is applied from a timer (RTC: Real Time Clock) circuit not shown which is provided in the image recording apparatus 16.

When a stop key 26*b* forming the operation key 26 is depressed during the recording operation, the CPU 24 respectively controls the SDRAM 28, the compression expansion circuit 30 and the hard disk 32 so as to stop the recording operation, and whereby, a series of recording operations is stopped. It is noted that even if the recording operation is stopped, the live image is continued to be displayed on the monitor device.

The image recorded on the hard disk 32, i.e., compressed image file is reproduced in response to a depression of a reproduction start key (play key) 26c forming the operation key 26. That is, when the reproduction start key 26c is depressed, the CPU 24 starts a reproducing operation.

When the reproduction operation is started, the CPU 24 temporarily reads the compressed image file recorded on the hard disk 32 to the SDRAM 28 and transfers the read compressed image file to the compression expansion circuit 30. The compression expansion circuit 30 reproduces original image data by expanding the transferred compressed image file. The reproduced image data is temporarily stored in the SDRAM 28. Then, the CPU 24 interrupts an input of the image data from the image input interface circuit 18 to the video encoder 22 and alternatively inputs the expanded image data stored in the SDRAM 28 to the video encoder 22. Thus, a reproduced image is displayed on the screen of the monitor device alternative to the live image. It is noted that when the above-described stop key 26b is depressed, the reproduction operation is stopped, and a screen display of the monitor device is switched from a reproduced image to a live image.

By the way, a compression ratio is adjusted by the compression expansion circuit 30 such that a size S of the compressed image file per one field falls within a predetermined range in this embodiment. Thus, the size S of the compressed image file falls within a constant range, so that it becomes easy to deal with the compressed image files and to manage a capacity of the hard disk 32. This adjustment of the compression ratio is performed by the CPU 24.

Figure 2:
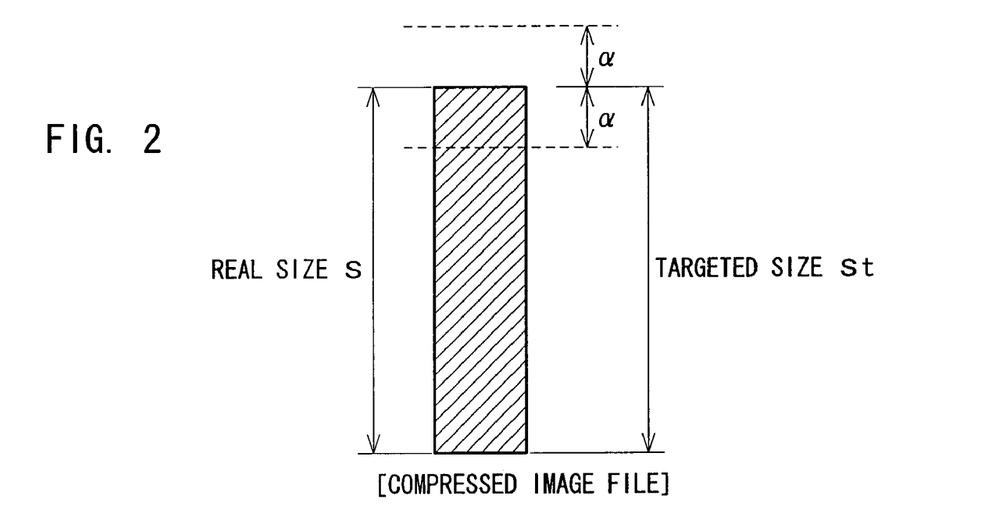
FIG. 2 is an illustrative view showing one part of an operation of FIG. 1 embodiment.

More specifically, as shown in FIG. 2, a target size St is decided in advance as the size S of the compressed image file. A value "St−α" which is decrease of a predetermined amount α compared to the target size St is a lower limit acceptable as the size S of the compressed image file while a value "St+α" which is increase of a predetermined amount α compared to the target size St is an upper limit. It is noted that 10 [%] of the target size St is suitable for the predetermined amount α. The CPU 24 adjusts the compression ratio by the compression expansion circuit 30 such that the size S of the compressed image file becomes a value which is more than the lower limit "St−α" and less than the upper limit "St+α", i.e., St−α≦S≦St+α.

The CPU 24 stores a quantization table Qs (strictly speaking, two reference tables for a luminance table and a chrominance table) to be referred in a memory 34 incorporated into oneself in order to adjust the compression ratio. Then, the CPU 24 makes the compression expansion circuit 30 execute a compression process on the basis of a quantization table Q(=Qs·f(A)) obtained by multiplying the reference table Qs by a coefficient A, and renews the value of the coefficient A such that the size S of the compressed image file after a compression process falls within the predetermined range (St−α≦S≦St+α).

It is noted that the coefficient A is an integer between "1" and "100". Then, the larger the value of the coefficient A is, the higher the compression ratio is while the smaller the value of the coefficient A is, the lower the compression ratio is.

The above-described target size St is different depending on a recording mode m. The recording mode m is a parameter to specify a quality of an image (compressed image file) recorded on the hard disk 32, and total five recording modes m from a mode "1" to a mode "5" are prepared in this embodiment. Then, the target size S is different depending on which recording mode m is selected. The recording mode m is determined by operating a recording mode selection (Mode) key 26d forming the operation key 26.

For example, where the mode "1" is selected as the recording mode m, the target size St is set to 56 [KB]. Then, where the mode "2" is selected, the target size St is set to 42 [KB], and where the mode "3" is selected, the target size St is set to 30 [KB]. Where the mode "4" is selected, the target size St is set to 22 [KB], and where the mode "5" is selected, the target size St is set to 15 [KB].

It is noted that largeness of the target size St causes high in the quality of the recorded image and low in the number of the images to be recorded on the hard disk 32. That is, a recording time becomes short. On the other hand, smallness of the target size causes low in the quality of the recorded image; however, the recording time becomes long.

Now, assuming that a certain surveillance camera 12 is selected by the multiplexer 14, a certain recording mode m is selected in the image recording apparatus 16, and the CPU 24 executes a recording operation according to the recording mode m. In this state, the CPU 24 adjusts the compression ratio (coefficient A) of the compression expansion circuit 30 such that the size S of the compressed image file falls within the range according to the recording mode m as described above, i.e., St−α≦S≦St+α.

Herein, assuming that the surveillance camera 12 selected by the multiplexer 14 is switched, and whereby, the size of the image data input to the image recording apparatus 16 varies. Also in this case, the CPU 24 adjusts the compression ratio of the compression expansion circuit 30 such that the size S of the compressed image file falls within the target range (St−α≦S≦St+α).

However, the change of the compression ratio of the compression expansion circuit 30 depending on the change of the size of the image data to be compressed causes a repetition of the compression process by the compression expansion circuit 30 several times, and therefore, it takes a reasonable time. On the other hand, in a case a compressed image file is to be recorded on the hard disk 32 at a certain period, the size S of the compressed image file needs to fall within the target range within a predetermined time period. Accordingly, in a case the change of the size of the image data is extremely large, the size S of the compressed image file cannot fall within the target range, and therefore, there occurs a disadvantage that the recording operation is breaks down.

This holds true for a case that the recording mode m is changed during the recording operation. That is, in a case that the recording mode m is changed, the target size St (target range) is changed, and therefore, even if the size of the image data to be compressed is not changed, there is a need to adjust the compression ratio of the compression expansion circuit 30 as the target size St is changed. Thus, in a case the target size St changes extremely sharply due to a change of the recording mode m, i.e., the recording mode m is changed from the mode "1" to the mode "5", there is a possibility that the recording operation breaks down as described above.

Figure 3:
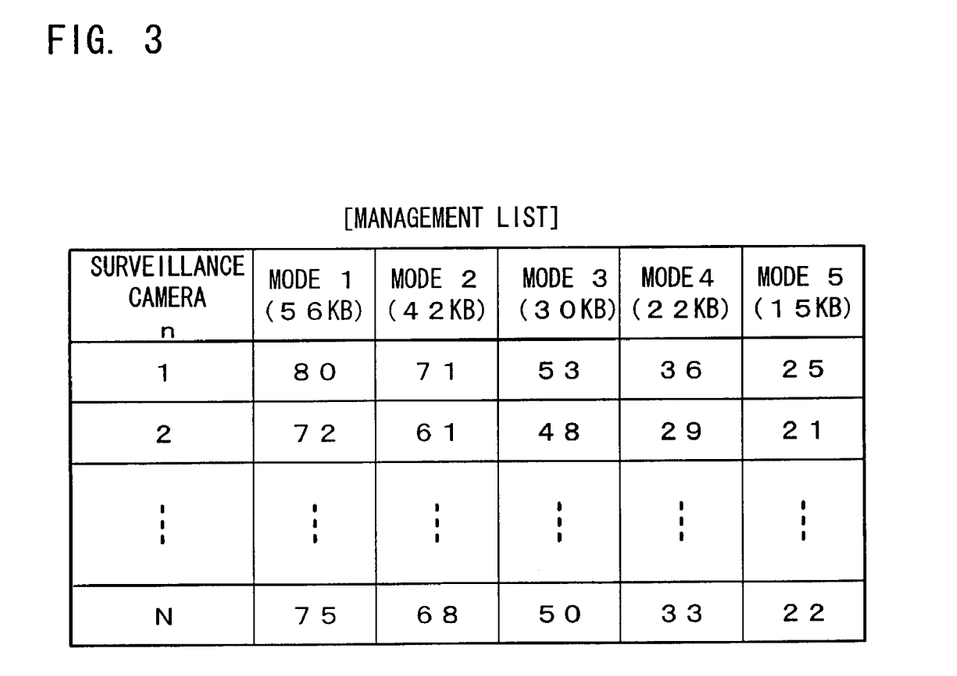
FIG. 3 is an illustrative view showing one example of a management list utilized in FIG. 1 embodiment.

This is a reason why the image recording apparatus 16 of this embodiment is provided with an initialization function which sets in advance a reference value Ab of the coefficient A for each surveillance camera 12 in every recording mode. According to the initialization function, the reference coefficient Ab is specified such that the size S of the compressed image file falls within the target range for each surveillance camera 12 in every recording mode. Then, the specified reference coefficient Ab is registered in the management list as shown in FIG. 3 and stored in the memory 34 within the CPU 24.

In the above-described recording operation, a compression process is performed by the compression expansion circuit 30 on the basis of the reference coefficient Ab stored in the management list. That is, when a certain surveillance camera 12 is selected by the multiplexer 14 and a certain recording mode m is selected by operating the recording mode selection key 26d, the reference coefficient Ab corresponding to a combination of the surveillance camera 12 and the recording mode m is read from the management list. Then, a compression process is performed on the basis of the read reference coefficient Ab.

It is noted that in a case that the size S of the compressed image file after the compression process based on the reference coefficient Ab does not fall within the target size, the coefficient A is adjusted such that the size S falls within the target range regarding the reference coefficient Ab as a start point. Then, the adjusted coefficient A is stored in the management list as a new reference coefficient Ab. That is, the reference coefficient Ab is renewed. Then, the renewed reference coefficient Ab is utilized when the same surveillance camera 12 and the same recording mode m are selected next. In a case that the size S of the compressed image file after the compression process based on the reference coefficient Ab does not fall within the target range, the coefficient A is adjusted again regarding the reference coefficient Ab as a start point.

It is noted that in a case that the size S of the compressed image file does not fall within the target range, even where the adjustment of the coefficient A is repeated several times, the adjustment process of the coefficient A is stopped. More specifically, a value "A+β" obtained by adding a predetermined vale β to the reference coefficient Ab before adjustment is an upper limit Amax of the coefficient A in the adjustment process, and a value "A−β" obtained by subtracting a predetermined value β from the reference coefficient Ab is a lower limit Amin. Then, in a case the value of the coefficient A reaches, for example, the upper limit Amax, in the adjustment process (increasing and decreasing process) of the coefficient A, the adjustment process is stopped, and the upper limit A max is stored in the management list as the new reference coefficient Ab. On the other hand, in a case that the value of the coefficient A reaches the lower limit Amin, the lower limit Amin is stored in the management list as the new reference coefficient Ab. Thus, limitations in the range of the adjustment of the coefficient A prevent endless repetition of the adjustment process of the coefficient A.

It is preferable that the initialization operation by the initialization function is performed before the surveillance camera system 10 is actually utilized, e.g., directly after the surveillance camera system 10 is set in an actual job site. Furthermore, it is preferable that in the initialization operation, the multiplexer 14 selects each of surveillance cameras 12, 12, . . . in an identifying number n order (1→2→3→ . . . →N→1→ . . . ), and a surveillance camera 12 to be selected is switched at a certain period (e.g., several field periods to several tens of filed periods). The preferable initialization operation is started in response to a depression of an initialization key (Set Up key) 26e forming the operation key 26. That is, when the initialization key 26e is depressed, the CPU 24 executes an initialization process shown in flowcharts of FIG. 4 and FIG. 5 according to a control program stored in the memory 34.

Figure 4:
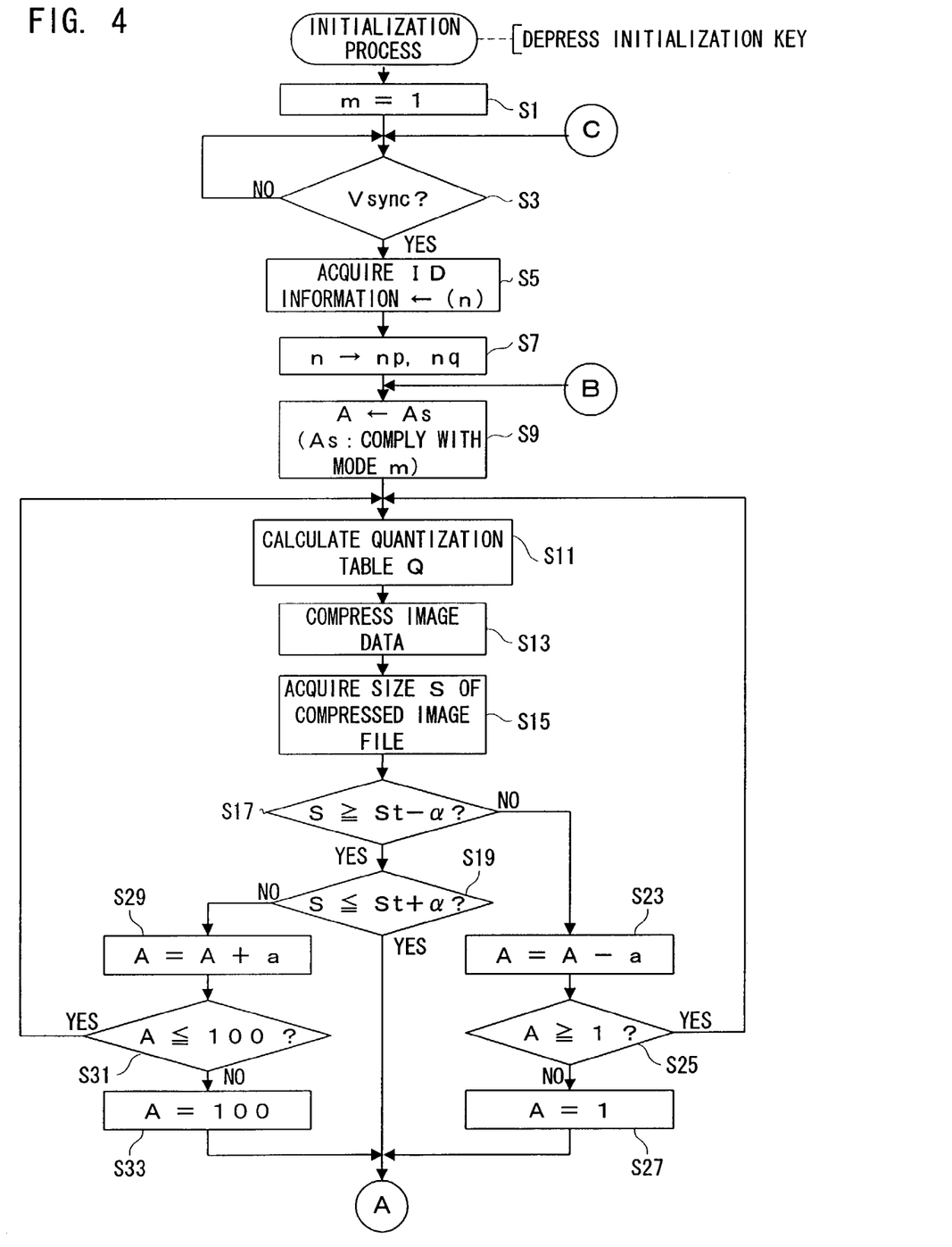
FIG. 4 is a flowchart showing one part of an operation of a CPU at a time of an initialization process.

Referring to FIG. 4, when the initialization key 26e is depressed, the CPU 24 proceeds to a step S1 so as to set an index m (m=1,2, . . . M; herein, M=5) for designating a recording mode to "1", and whereby, the recording mode m is forcedly set to "1" irrespective of the above-described operation of the recording mode selection key 26d.

Then, the CPU 24 proceeds to a step S3 and waits an input of a vertical synchronization signal Vsync of the image data from the multiplexer 14. Herein, when the vertical synchronization signal Vsync is detected, the CPU 24 proceeds to a step S5 so as to acquire the above-described ID information from the VBI of the image data, and whereby, the CPU 24 recognizes an identifying number n of a surveillance camera 12 currently selected by the multiplexer 14.

After the process of the step S5, the CPU 24 proceeds to a step S7 so as to store the identifying number recognized in the step S5 in two registers np and nq. It is noted that the register np is a temporary storage area for storing the identifying number n of the currently selected surveillance camera 12, and the register nq is a temporary storage area for storing the identifying number n of the surveillance camera 12 first selected in an arbitrary mode m. These registers np and nq are provided in the memory 34.

Then, the CPU 24 proceeds to a step S9 so as to set the coefficient A to a default value As corresponding to the current recording mode m (mode 1 at this time). For example, when the current recording mode m is "1", the default value As of "80" is set as the coefficient A. Then, when the current recording mode m is "2", the default value As of "65" is set as the coefficient A while the recording mode is "3", the default value As of "50" is set as the coefficient A. Then, when the current recording mode m is "4", the default value As of "35" is set as the coefficient A while the recording mode is "5", the default value As of "20" is set as the coefficient A. These default values are also stored in the above-described memory 34.

After setting the coefficient A in the step S9, the CPU 24 proceeds to a step S11 so as to calculate the quantization table Q (=Qs·f(A)) on the basis of the coefficient A and the reference table Qs set. Then, the CPU 24 fetches from the SDRAM 28 the image data of the surveillance camera 12 currently selected in a step S13, and then, compresses the fetched image data on the basis of the calculated quantization table Q (strictly speaking, make the compression expansion circuit 30 execute the compression process).

After completing the compression process in the step S13, the CPU 24 proceeds to a step S15 so as to acquire the size S of the compressed image file from the compression expansion circuit 30. Then, the CPU 24 compares the size S of the acquired compressed image file with the above-described lower limit "St−α" of the target range in a step S17. Herein, when the size S of the compressed image file is equal to or more than the lower limit "St−α", the CPU 24 proceeds to a step S19. The CPU 24 compares the size S of the compressed image file with the upper limit "St+α" of the target range in the step S19.

When the size S of the compressed image file is equal to or less than the upper limit "St+α" in the step S19, the CPU 24 determines the size S of the compressed image file falls within the target size. That is, the CPU 24 determines that if the compression process is performed on the basis of the coefficient A currently set, it is possible to make the size S of the compressed image file within the target range. Then, the CPU 24 proceeds to a step S21 shown in FIG. 5 so as to store the coefficient A currently set as the reference coefficient Ab in the above-described management list.

On the other hand, when the size S of the compressed image file is smaller than the lower limit "St−α", the CPU 24 determines that the current compression ratio is extremely high in the step S17. The CPU 24 decrements the coefficient A by a predetermined value a (e.g., a=1) in a step S23 so as to decrease the compression ratio, and then, the process proceeds to a step S25. Then, it is determined whether the coefficient A after decrement is settable or not, i.e., the coefficient A is equal to or more than "1" or not in the step S25. When the coefficient A is equal to or more than "1", the process returns to the step S11 so as to make the CPU 24 execute the compression process again on the basis of the coefficient A after the decrement in the step S23. On the contrary thereto, when the coefficient A after the decrement is smaller than "1", the CPU 24 proceeds to a step S27. The CPU 24 sets "1" as the coefficient A in the step S27 and then proceeds to the step S21 shown in FIG. 5 so as to store "1" of the coefficient A as the reference coefficient Ab in the management list.

When the size of the compressed image file is more than the upper limit "St+α", the CPU 24 determines the current compression ratio is extremely low in the step S19. Then, the CPU 24 increments the coefficient A by a predetermined value a in a step S29 so as to increase the compression ratio, and then proceeds to a step S31. Then, it is determined whether the coefficient A after the increment is settable or not, i.e., the coefficient A is equal to or less than "100" in the step S31. When the coefficient A is equal to or less than "100, the CPU 24 returns to the step S11 so as to execute the compression process again on the basis of the coefficient A after the increment in the step S29. On the contrary thereto, when the coefficient A after the increment is more than "100", the CPU 24 proceeds to a step S33. Then, after setting "100" as the coefficient A in the step S33, the CPU 24 proceeds to the step S21 shown in FIG. 5 so as to store the "100" of the coefficient A as the reference coefficient Ab in the management list.

Figure 5:
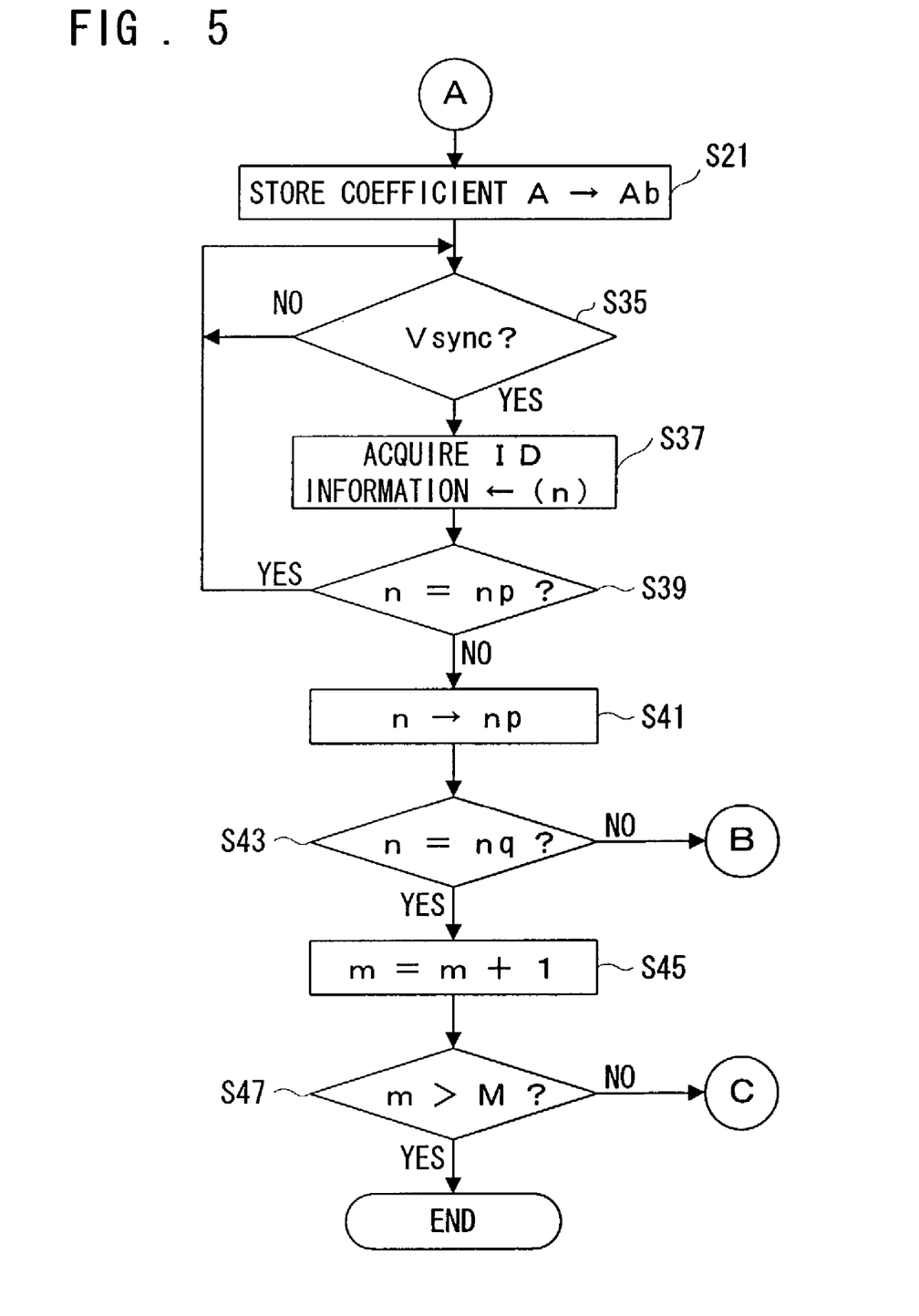
FIG. 5 is a flowchart showing another part of an operation of the CPU at a time of the initialization process.

After storing the reference coefficient Ab in the management list in the step S21, the CPU 24 proceeds to a step S35. Then, the CPU 24 waits an input of the vertical synchronization signal Vsync of the image data from the multiplexer 14 in the step S35. When detecting the vertical synchronization signal Vsync, the CPU 24 acquires the ID information from the VBI of the image data in a step S37 so as to recognize an identifying number n of the surveillance camera 12 currently selected. In a step S39, it is determined whether or not the identifying number n is the same as the number stored in the register np in the above-described step S7.

When the identifying number n recognized in the step S37 is the same as the number stored in the register np (n=np), the CPU 24 determines the surveillance camera 12 selected by the multiplexer 14 has not yet switched in a step S39. Then, the process returns to the step S35 so as to wait an input of the vertical synchronization signal Vsync from the multiplexer 14.

On the other hand, in a case the identifying number n recognized in the step S37 is different from the number stored in the register np (n≠np), the CPU 24 determines another surveillance camera 12 is selected by the multiplexer 14. The CPU 24 proceeds from the step S39 to a step S41 so as to store again the identifying number n of the currently selected surveillance camera 12 in the register np.

Furthermore, the CPU 24 proceeds to a step 43 so as to compare the identifying number n of the currently selected surveillance camera 12 with the number stored in the register nq in the above-described step S7. When both of them are different (n≠nq), the CPU 24 determines setting of the reference coefficient Ab as to all the surveillance cameras 12, 12, . . . has not yet finished in the current recording mode m. Then, the CPU 24 returns to the step S9 shown in FIG. 4 so as to set the reference coefficient Ab corresponding to the current recording mode m as to the currently selected surveillance camera 12.

On the other hand, when the identifying number n of the currently selected surveillance camera 12 is the same as the number stored in the register nq (n=nq), the CPU 24 determines that setting of the reference coefficient Ab as to all the surveillance cameras 12, 12, . . . in the current recording mode m has finished. Then, the CPU 24 proceeds from the step S43 to a step S45. In the step S45, the CPU 24 increments an index value m by 1 in the recording mode so as to set the reference coefficient Ab in another recording mode (m+1).

Then, the CPU 24 proceeds to a step S47 so as to compare the index value m in the recording mode after the increment with a maximum value M (M=5 in this embodiment) of the index value m. When the index value m after the increment is equal to or less than the maximum value M, the CPU 24 determines that the reference coefficient Ab has not yet been set in all the recording modes m, and then returns to the step S3 shown in FIG. 4. On the other hand, in a case that the index value m after the increment is more than the maximum value M, the CPU 24 determines that the setting of the reference coefficient Ab of all surveillance cameras 12, 12, . . . in all recording modes m has finished and then, a series of initialization processes is completed.

When the record starting key 26a is depressed after completion of the initialization process, the CPU 24 starts a recording operation. In the recording operation, the CPU 24 executes a recording process shown in FIG. 6 and FIG. 7 according to the above-described control program. It is noted that a selecting order of each of the surveillance cameras 12, 12, . . . by the multiplexer 14 and a switching period of the surveillance camera 12 to be selected are arbitrary in the recording operation. Furthermore, the recording mode m is set to a mode according to the operation of the recording mode selection key 26d.

Figure 6:
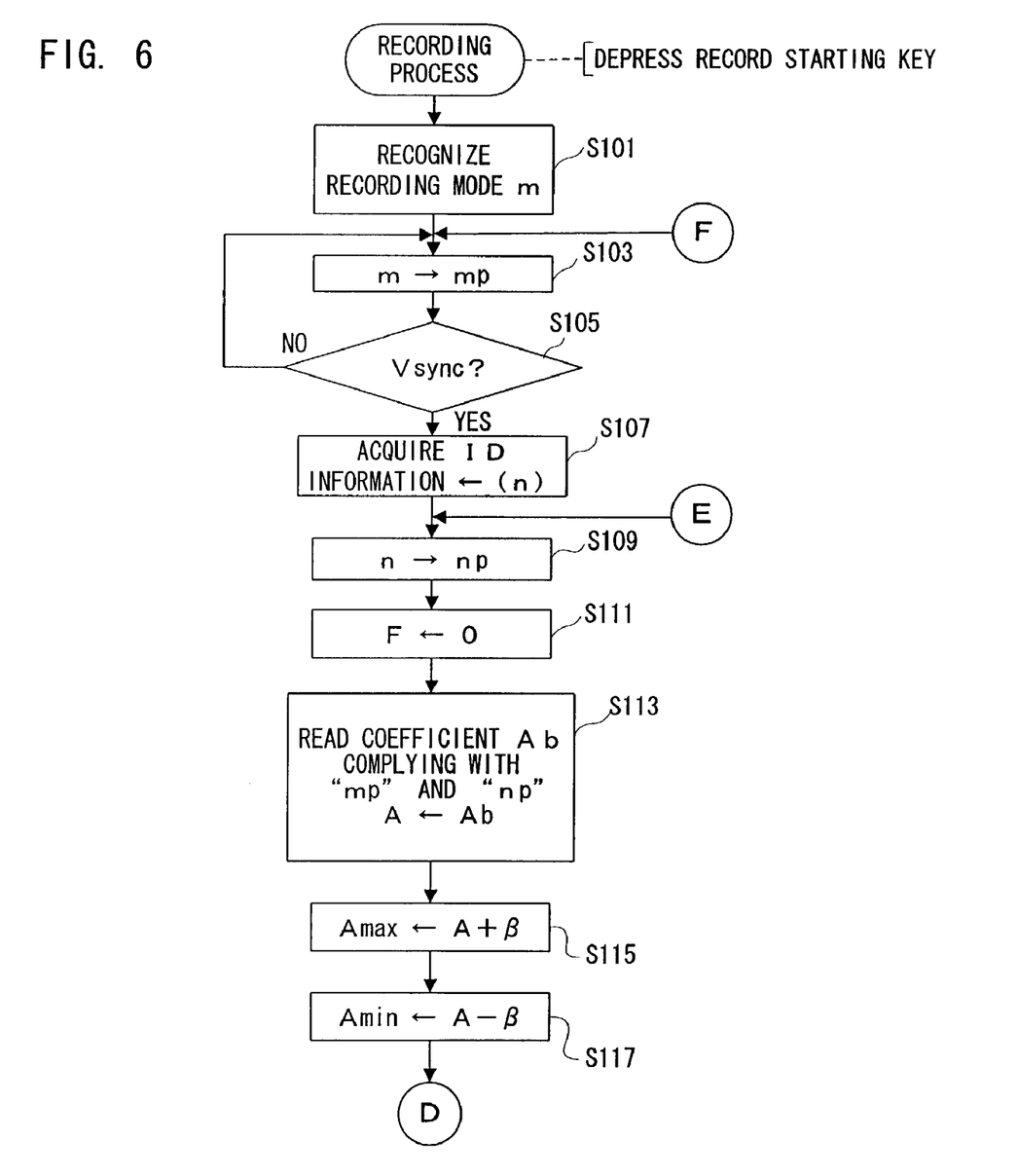
FIG. 6 is a flowchart showing one part of an operation of the CPU at a time of a recording process.

Referring to FIG. 6, when the record starting key 26a is depressed, the CPU 24 proceeds to a step S101 so as to recognize a currently set recording mode m. Then, the CPU 24 proceeds to a step S103 so as to store the recognized recording mode m in a register mp. The register mp is a temporary storage area for storing a currently set recording mode m and provided within the memory 34.

After the process of the step S103, the CPU 24 proceeds to a step S105 and waits an input of the vertical synchronization signal Vsync of the image data from the multiplexer 14. When detecting the vertical synchronization signal Vsync, the CPU 24 acquires the ID information from the VBI of the image data in a step S107 so as to recognize the identifying number n of the surveillance camera 12 currently selected by the multiplexer 14. Then, the CPU 24 proceeds to a step S109 so as to store the recognized identifying number n in the above-described register np.

Furthermore, the CPU 24 proceeds to a step S111 so as to set "0" to a flag F. The flag F is an index indicative of whether or not an adjustment process of the coefficient A is performed as to a combination of the surveillance camera 12 currently selected and the recording mode m currently set after the combination is established. That is, in a case the flag F is "0", the flag F is an index indicating that the adjustment process of the coefficient A has not yet finished. On the other hand, in a case the flag F is "1", the flag F is an index indicating that the adjustment process of the coefficient A has finished. It is noted that the flag F is also provided within the memory 34.

After completion of the step S111, the CPU 24 proceeds to a step S113 so as to read the reference coefficient Ab corresponding to a value stored in the above-described register mp (i.e., recording mode m currently set) and a value stored in the register np (i.e., the identifying number n of the surveillance camera 12 currently selected) from the management list. Then, the read reference coefficient Ab is set to the coefficient A.

Then, the CPU 24 proceeds to a step S115 and stores in a register within the memory 34 a value "A+β" obtained by adding a predetermined value β to the currently set coefficient A (reference coefficient Ab) as the above-described upper limit Amax (a code Amax is utilized for the register). It is noted that in a case that the value "A+β" is equal to or more than "100" (A+β≧100), a value of "100" is stored in the register Amax.

Furthermore, the CPU 24 stores in a register within the memory 34 a value "A−β" obtained by subtracting a predetermined value β from the current coefficient A (reference coefficient Ab) as the above-described lower limit A min in a step S117 (a code Amin is utilized for the register). It is noted that in a case that a value "A−β" is equal to or less than "1" (A−β≦1), a value of "1" is stored in the register Amin.

After completion of the step S117, the CPU 24 proceeds to a step S119 shown in FIG. 5. Then, the quantization table Q (=Qs·f (A)) is calculated on the basis of the currently set coefficient A and the reference table Qs in the step S119. In a step S121, the CPU 24 captures the image data of the surveillance camera 12 currently made effective, and compresses the captured image data on the basis of the calculated quantization table Q.

Figure 7:
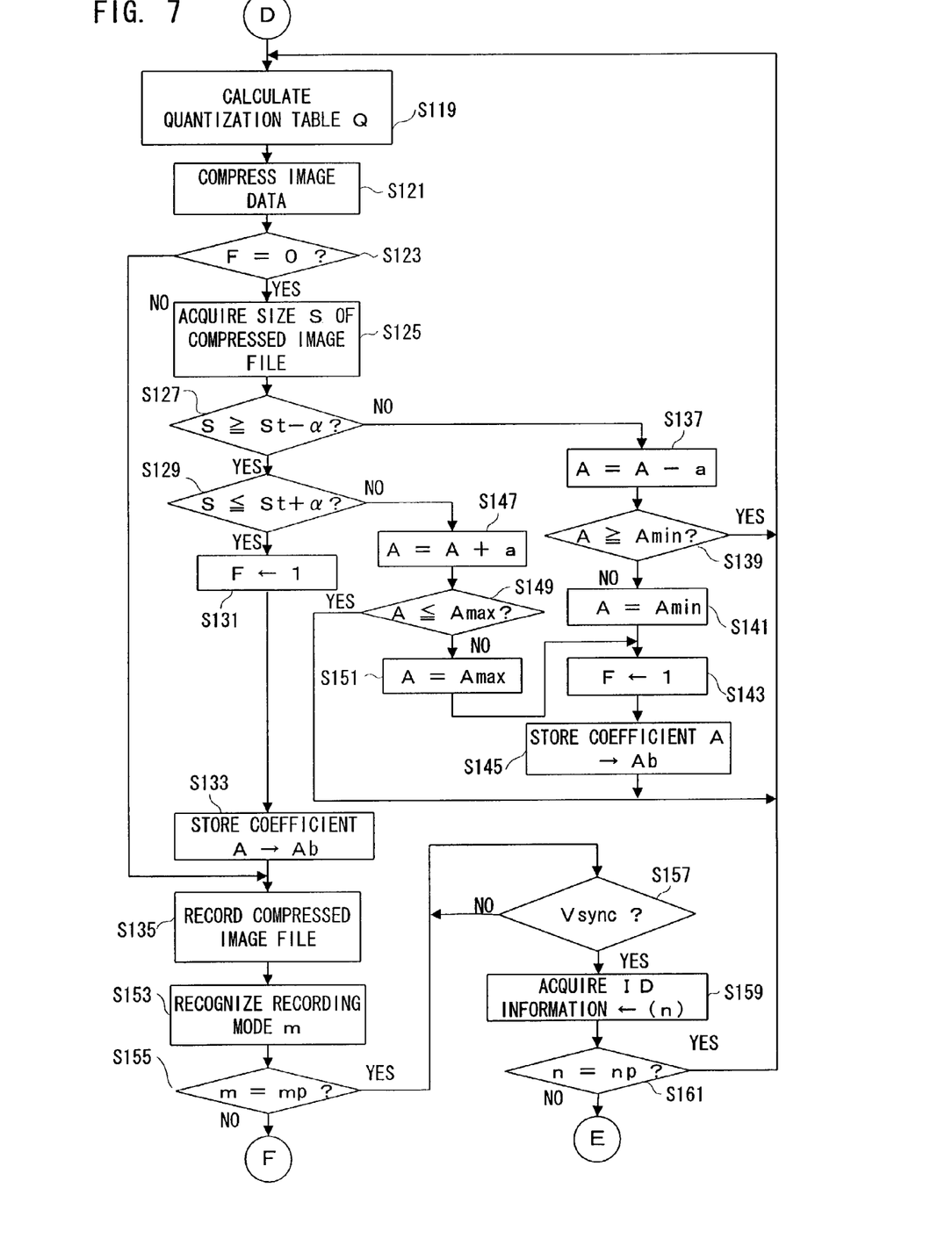
FIG. 7 is a flowchart showing another part of an operation of the CPU at a time of the recording process.

After completion of the compression process in the step S121, the CPU 24 proceeds to a step S123 so as to determine whether or not the above-described flag F is "0". If it is determined the flag "F" is not "0", the CPU 24 recognizes that the adjustment process of the coefficient A has not yet finished and proceeds to a step S125. Then, the CPU 24 acquires the size S of the compressed image file from the compression expansion circuit 30 in the step S125. Furthermore, the CPU 24 proceeds to a step S127 so as to compare the size S of the acquired compressed image file with the above-described lower limit "St−α" of the target range. It is noted the fact that the lower limit "St−α" is changed depending on the recording mode m is as described above.

If the size of the compressed image file is equal to or more than the lower limit "St−α", the CPU 24 proceeds from the step S127 to a step S129. Then, the CPU 24 compares the size S of the compressed image file with the upper limit "St+α" of the target range in the step S129. The fact that the upper limit "St+α" is changed depending on the recoding mode m is also described above.

When the size S of the compressed image file is equal to or less than the upper limit "St+α", the CPU 24 determines that the size S of the compressed image file holds within the target range (St−α≦S≦St+α) in the step S129. That is, it is determined that the coefficient A utilized in the current compression process is an appropriate compression ratio for compressing the image data output from the currently selected surveillance camera 12 in the currently selected recording mode m. Then, the CPU 24 sets the flag F to "1" in a step S131, and this indicates that the adjustment process of the coefficient A is completed.

After completion of the process in the step S131, the CPU 24 proceeds to a step S133 so as to store the current coefficient A as the reference coefficient Ab in the management list. Then, the CPU 24 proceeds to a step S135 so as to record the compressed image file after the compression process in the step S121 on the hard disk 32 (strictly speaking, the compressed image file is transferred to the hard disk 32 through the SDRAM 28 to be recorded).

On the other hand, when the size S of the compressed image file is less than the lower limit "St−α", the CPU 24 determines that the current compression ratio is extremely high in the step S127, and then proceeds to a step S137. The CPU 24 decrements the coefficient A by a predetermined value a so as to decrease the compression ratio, and then proceeds to a step S139. The coefficient A after the decrement is compared with the value stored in the above-described register Amin in the step S139. When the value of the coefficient A after the decrement is equal to or more than the value stored in the register Amin (A≧Amin), the CPU 24 determines the adjustment process of the coefficient A may be continued. Then, the CPU 24 returns to the step S119 so as to execute the compression process again on the basis of the coefficient A after the decrement.

On the contrary thereto, when the value of the coefficient A after the decrement in the step S137 is less than the value stored in the register Amin (A<Amin), the CPU 24 determines the coefficient A after decrement reaches the lower limit Amin of the adjustment range. Then, the CPU 24 proceeds from the step S139 to a step S141 so as to stop the adjustment process of the coefficient A and sets the coefficient A to the value stored in the register Amin.

After the process of the step S141, the CPU 24 proceeds to a step S143 so as to set the flag F to "1". The flag F indicates that the adjustment process of the coefficient A is completed, i.e., the adjustment process is forcedly completed. Then, the CPU 24 proceeds to a step S145 so as to store the current coefficient A as the reference coefficient Ab in the management list. That is, the reference coefficient Ab is renewed. After the renewal of the reference coefficient Ab, the CPU 24 returns to the step S119 so as to execute the compression process again on the basis of the current coefficient A (reference coefficient Ab after renewal).

When the size S of the compressed image file is more than the upper limit "St+α", the CPU 24 determines in the step S129 that the current compression ratio is extremely low, and then proceeds to a step S147. The CPU 24 increments the coefficient A by a predetermined value a so as to increase the compression ratio, and then proceeds to a step S149. The CPU 24 compares the coefficient A after the increment with the value stored in the register Amax in the step S149. When the value of the coefficient A after the increment is less than the value stored in the register Amax (A≦Amax), the CPU 24 determines the adjustment process of the coefficient A may be continued. Then, the process returns to the step S119 so as to execute the compression process again on the basis of the coefficient A after the increment.

On the contrary thereto, when the value of the coefficient A after the increment in the step S147 is more than the value stored in the register Amax, the CPU 24 determines that the coefficient A after the increment reaches the upper limit of the adjustment range, and then proceeds from the step S149 to a step S151. In the step S151, the CPU 24 sets to the coefficient A the value stored in the register Amax so as to stop the adjustment process of the coefficient A, and then proceeds to the above-described step S143.

If the recording of the compressed image file on the hard disk 32 in the above-described step S135 is completed, the CPU 24 proceeds to a step S153 so as to recognize the recording mode m currently set. Furthermore, the CPU 24 proceeds to a step S155 so as to compare the recording mode m recognized in the step S153 with the value stored in the register mp in the above-described step S103. When both of them are the same (m=mp), the CPU 24 determines that the recording mode m is not switched (a recording mode selection key 26d is not operated). Then, the CPU 24 proceeds to a step S157 and waits an input of the vertical synchronization signal Vsync of the image data from the multiplexer 14.

When the vertical synchronization signal Vsync is detected in the step S157, the CPU 24 proceeds to a step S159. Then, the CPU 24 acquires the ID information from the VBI of the image data and recognizes the identifying number n of the currently selected surveillance camera 12. Then, the CPU 24 proceeds to a step S161 so as to compare the identifying number n recognized in the step S159 with the value stored in the register np in the above-described step S113. When both of them are the same (n=np), the CPU 24 determines that the surveillance camera 12 selected by the multiplexer 14 has not yet switched. Then, the process returns to the step S119 so as to continue the compression process on the basis of the currently set coefficient A (reference coefficient Ab).

On the other hand, the identifying number n of the currently selected surveillance camera 12 is different from the value stored in the register np, the CPU 24 determines in the step S161 that the surveillance camera 12 selected by the multiplexer 14 is switched. Then, the process returns to the step S109 shown in FIG. 6 so as to perform the compression process on the basis of the reference coefficient Ab corresponding to the newly selected surveillance camera 12.

In a case the recording mode m recognized in the step S153 is different from the value stored in the register mp in the step S103, the CPU 24 determines in the step S55 that the recording mode m is switched. Then, the process returns to the step S103 shown in FIG. 6 so as to execute the compression process again according to the newly switched recording mode m.

It is noted that in a case that the flag F is not "0", i.e., it is "1", the CPU 24 determines in the step S123 shown in FIG. 7 that the adjustment process as to the coefficient A is completed. In this case, the CPU 24 proceeds from the step S123 to the step S135 so as to record the compressed image file compressed in the step S121 on the hard disk 32.

As can be understood from the above description, utilization of the initialization process specifies the reference coefficient Ab for falling the size S of the compressed image file within the target range in a combination of each of the surveillance cameras 12, 12, . . . and each of the recording modes m. Then, the compression process is preformed on the basis of the reference coefficient Ab at a time of the recording operation. Accordingly, even if the size of the image data to be compressed is sharply changed, due to the surveillance camera 12 selected by the multiplexer 14 being switched or the recording mode m being changed during the recording operation, it is possible to soon compress the image data up to the target size depending on the change of the size.

Furthermore, when the size S of the compressed image file after the compression process does not fall within the target range at a time of the recording operation, the reference coefficient Ab is renewed such that the size S falls within the target range. Then, the compression process is performed on the basis of the renewed reference coefficient Ab. Accordingly, it is possible to quickly compress the image data to be compressed at a proper compression ratio.

It is noted that description is made on a case that the invention is applied to the surveillance camera system 10 in this embodiment, it is needless to say that the present invention is applied to another application except the surveillance camera system 10.

Then, the recording medium is not limited to the hard disk 32 and may be another recording medium such as a videotape, a DVD (Digital Versatile Disc), CD-RW (CD ReWritable) and etc.

In addition, the quantization table Q is controlled by adjusting the coefficient A and whereby, the compression ratio is controlled; however, it is not limited to this. For example, a plurality of quantization tables Q are prepared in advance and an arbitrary table is selected from among the plurality of quantization tables Q, so that the compression ratio may be controlled.

Then, although the motion JPEG format by the compression expansion circuit 30 is adopted as a compression format, a simple JPEG format may be adopted. Furthermore, an MPEG (Motion Picture Expert Group) format being a compression format for a motion image may be adopted. It is noted that the compression process is performed for each GOP (Group of Pictures) in the MPEG format, so that the size of each GOP falls within the target size.

Furthermore, although five modes "1" to "5" are prepared as a recording mode m, the number is not limited to this. That is, a plurality of recording modes m except 5 may be prepared, and the recording mode m may be only one.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
    an inputter for inputting a plurality of camera images output from a plurality of fixed cameras and multiplexed in a time-division manner;
    a memory for storing a plurality of reference compression ratios respectively related to the plurality of camera images input by said inputter;
    a reader for reading from said memory a reference compression ratio related to a current camera image which is currently input by said inputter;
    a specifier for specifying an optimal compression ratio for the current camera image on the basis of the reference compression ratio read by said reader;
    a compressor for compressing the current camera image using the optimal compression ratio specified by said specifier; and
    a renewer for renewing the reference compression ratio related to the current camera image and stored in said memory by the optimal compression ratio specified by said specifier.

2. An image processing apparatus according to claim 1, wherein
    said specifier specifies a compression ratio capable of compressing the current camera image up to a size within a predetermined range as the optimal compression ratio.

3. An image processing apparatus according to claim 1, wherein
    said compressor performs the compression in accordance with a JPEG format.

4. An image processing apparatus according to claim 1, further comprising a recorder for recording a compressed camera image compressed by said compressor onto a recording medium.

5. A surveillance camera system comprising an image processing apparatus according to claim 1.

6. A surveillance camera system comprising an image processing apparatus according to claim 2.

7. A surveillance camera system comprising an image processing apparatus according to claim 3.

8. A surveillance camera system comprising an image processing apparatus according to claim 4.

9. An image processing apparatus, comprising:
   a capture for capturing a plurality of camera images output from a plurality of fixed cameras and multiplexed in a time-division manner;
   a memory for storing a plurality of compression ratios respectively corresponding to a plurality of image quality modes in association with each of said plurality of fixed cameras;
   a selector for selecting any one of the plurality of image quality modes;
   a reader for reading from said memory a compression ratio corresponding to a current camera image currently captured by said capture and an image quality mode selected by said selector;
   a compressor for compressing the current camera image based on the compression ratio read out by said reader;
   a specifier for specifying a plurality of compression ratios respectively corresponding to the plurality of image quality modes in association with each of said plurality of fixed cameras at a time of accepting an initializing instruction; and
   a writer for writing to said memory the compression ratios specified by said specifier.

10. A surveillance camera system comprising an image processing apparatus according to claim 9.

* * * * *